Feb. 24, 1953 W. M. DEATON 2,629,253
MOISTURE CONTENT RECORDER FOR GASES UNDER PRESSURE
Filed June 5, 1951 2 SHEETS—SHEET 2

INVENTOR
WILLIAM M. DEATON
BY
H. L. Godfrey
ATTORNEY

Patented Feb. 24, 1953

2,629,253

UNITED STATES PATENT OFFICE 2,629,253

MOISTURE CONTENT RECORDER FOR GASES UNDER PRESSURE

William M. Deaton, Amarillo, Tex., assignor to the United States of America as represented by the Secretary of Interior Application June 5, 1951, Serial No. 230,016

1 Claim. (Cl. 73—29)

(Granted under Title 35, U. S. Code (1952), sec. 266)

The invenion described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to the general field of gas analysis, and more specifically to the indicating and recording of the water vapor content of gases which may be under pressure.

Heretofore, various attempts have been made to deveop a suitable instrument for indicating the water vapor content of natural gas or the like under the usual pressures encountered in the industry, such as, for example, pressures of the order of 1000 pounds per square inch. Insofar as is now known, none of the prior instruments which attempted to solve this problem are in commercial operation inasmuch as the instrument must be capable of withstanding the extremely high pressures encountered and at the same time be unaffected by the impurities encountered in natural gas.

This invention has for an object the provision of an instrument that will continuously indicate and record the water vapor content or the water dew-point temperature of gases. Another object of this invention is to provide a suitable method and apparatus for recording the water vapor content of natural gas under pressure. A further object is to develop a water vapor indicating and recording device for natural gas which can be successfully operated by relatively unskilled personnel with a minimum of attention. Other and further objects will be apparent.

The foregoing and related objects hereinafter apparent are accomplished by this invention wherein there are provided means for removing undesired constituents from the gas sample having combined therewith means for bringing the purified gas sample into contact with a humidity-responsive electrical resistance element, means for maintaining selected isothermal conditions at the zone of contact, means for regulating and measuring the flow of sample gas, and electrical means for indicating and recording variations in electrical resistance of the humidity-responsive resistance element.

In one preferred embodiment, the foregoing concept of means takes the form of a device for measuring the moisture content of a gas sample having the combination of a cylindrical temperature equalizing member with a non-corrosive pressure resistant receptacle radially extending through said member near the central portion thereof, a humidity-responsive electrical resistance element mounted in the said receptacle, cooling means including a coil embracing said member near the upper portion thereof, heat-exchange means including a coil embracing said member near the lower portion thereof, said heat-exchange coil being adapted to bring a purified gas sample to the temperature of said member and deliver it to said receptacle, means for electrically heating said member to a predetermined temperature, means connected to said heat-exchange coil for purifying the gas sample, means for controlling the flow rate of gas through said receptacle, and means for measuring and indicating the electrical resistivity of said humidity-responsive element.

The invention will be made clear by a reference to the ensuing description and accompanying drawings in which.

Figure 1:
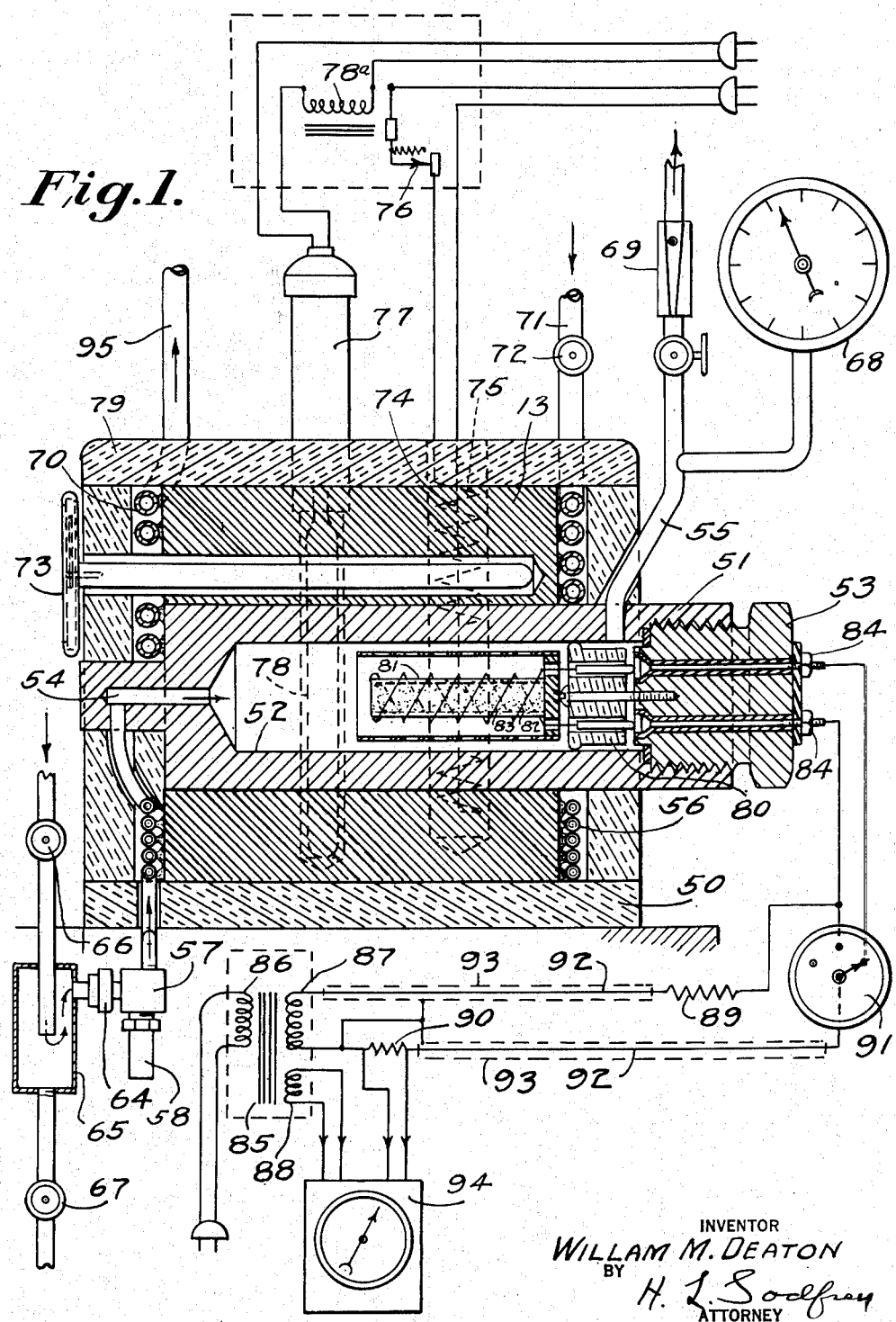
Figure 1 is a sectional elevation, partly diagrammatic, of the device of this invention and its electrical circuit.

This invention embodies the electrical hygrometer developed by F. W. Dunmore of the National Bureau of Standards and published by him in the Bureau of Standards Journal of Research, volume 23, December 1939. The hygrometer element is also covered by U. S. Patent No. 2,285,421, issued on June 9, 1942, to F. W. Dunmore.

The Dunmore hygrometer element depends on measuring the electrical resistance of a salt layer such as lithium chloride deposited upon a suitable supporting member therein. The electrical resistance of such a salt layer is inversely proportional to the moisture content of gases surrounding the salt layer, that is to say as the humidity increases, the electrical resistance decreases. By suitable calibration, the humidity of a gas sample can be determined by measuring the electrical resistance of the salt layer through a suitable bridge circuit. Fortunately, the salt layer also varies in electrical resistance depending upon its temperature. Thus, by maintaining isothermal conditions, the humidity of the gas sample surrounding the salt layer can be measured directly. In ordinary practice, the humidity of any particular gas sample does not vary over extremes and, therefore, for a given moisture content a predetermined temperature of contact is selected such as to give the most accurate reading of which the salt layer is capable. For example, an element sensitive to humidities ranging from 4 percent to 14 percent, calibrated at a temperature of 80° F., will be suitable for water dew-points ranging from approximately 0° F. to 26° F. when held at a temperature of 80° F. However, because of the temperature sensitivity of the hygrometer element if it is held at a temperature of 40° F. its humidity range will be approximately 8 percent to 18 percent and the water dew-point range will be from −16° F. to 0° F. This means that by selecting controlled isothermal conditions at which the gas is contacted with the salt layer of the hygrometer element, the device of this invention will cover a great variety of dew-point temperatures. Similarly, the composition of the salt layer can be varied as taught by Dunmore to cover any desired range of dew-point temperatures.

For a practical embodiment of this invention and referring now to the drawings, there is shown a cylindrical block 13 supported on an insulating base 50 herein. The block 13 may be made of any suitable heat conducting metal such as aluminum, copper and, preferably, brass, in order to provide for the establishment of a temperature equilibrium in the equipment mounted therein.

Radially extending through the central portion of the block 13 is a smaller cylinder 51 in heat transfer relationship with the block 13. The cylinder 51 has a central hollow portion 52 closed by a threaded plug 53. A gas inlet 54 is provided at one end of the cylinder 51 and a gas outlet 55 at the other end whereby the cylinder 51, threaded plug, 53, gas inlet 54 and gas outlet 55 defines a pressure receptacle embraced by the cylindrical block 13 through which gas may be brought. The cylinder 51 may be constructed of stainless steel, Monel metal or other suitable metal not corroded by the gases passed therethrough. Connected to the gas inlet 54 of the cylinder 51 is a tubular coil 56 embracing the lower portion of the block 13. The tubular coil 56 is in heat-exchange relationship with the block 13 and is preferably soldered or sweated thereto as shown, in order to provide a more rapid temperature equalization between the contents of the coil 56 and the block 13. The lower end of the coil 56 is connected to the glycol absorber fitting 57 shown in detail in Figure 3.

Figure 3:
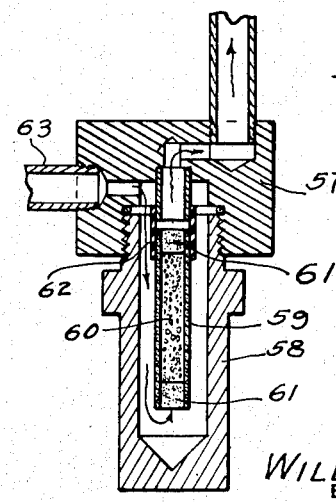
Figure 3 is a sectional elevational of the glycol removal device for purifying incoming gases.

As shown in Figure 3, the glycol absorber fitting 57 has depending therefrom a drilled cylinder 58 holding a tube 59 directly connected to the coil 56. Within the tube 59 is supported as mass of alumina gel 60 retained in place by a pair of porous plugs 61. A rubber sleeve 62 supports the tube 59 and provides a gas-tight connection with the coil 56. A nipple 63 allows the incoming gas to enter the fitting 57, pass downwardly around the tube 59, upwardly through one porous plug 61 and through the alumina gel 60. The gas then passes through the other porous plug 61 into the coil 56. The quantity of alumina gel 60 is selected so that in a few moments it becomes saturated with water vapor and thereafter the water vapor content of the gas passing through it remain unchanged. However, alumina gel has a preferential affinity for glycols and the glycols are selectively absorbed while, after the attainment of equilibrium, the water content of the gases remains unchanged. By suitable calibration, a cartridge can be employed for the glycol removal step in measuring the humidity of a predetermined quantity of gas.

Connected to the nipple 63 is a porous metal filter 64 adapted to remove solid impurities from the gas sample. The filter 64 may be composed of a block of sintered stainless steel or other suitable porous metal.

A trap 65 is connected through a short piece of pipe to the filter 64 and is connected through a valve 66 to the main source of gas to be sampled. The trap 65 is provided at its lower end with a bleed valve 67 to remove accumulated liquids deposited from suspension from the gas admitted through the valve 66.

From the foregoing, it wil be seen that gas to be sampled enters through the valve 66, liquids in suspension are removed in the trap 65 together with some solids, residual solids are removed in the porous metal filter 64 and glycols are absorbed in the alumina gel 60 of the fitting 57. Thereafter, the gases to be sampled pass through the coil 56 and enter the hollow portion 52 of the cylinder 51 by means of the inlet 54. The gases, after traversing the hollow portion 52, leave the cylinder 51 by way of the gas outlet 55.

Attached to the gas outlet 55 is a pressure gage 68 and a flow control device 69. Thus, when the inlet valve 66 is opened, sampled gas is purified, brought to the temperature of the block 13 and traverses the hollow portion 52 of the cylinder 51, its pressure is recorded by the gage 68 and its rate of flow controlled by the device 69 of conventional design.

In order to maintain selected isothermal conditions throughout the block 13, a tubular coil 70 is provided and disposed so as to embrace the upper portion of the block 13 in heat-exchange relationship therewith. Preferably, as shown, the coil 70 is soldered or sweated to the block 13 in order to provide a more rapid rate of heat transfer. An inlet tube 71, provided with a control valve 72, is connected to the coil 70 at one end thereof and the other end of the coil 70 is provided with an outlet tube 95. A suitable cooling fluid, which may be gaseous air or the like, enters the inlet tube 71 by means not shown and its velocity is controlled by the valve 72. Thereafter, the cooling gas traverses the coil 70 and is discharged through the outlet tube 95. It will be seen that the coil 70 can remove heat at any desired rate from the block 13 and its associated devices. A thermometer 73 is radially mounted in the block 13 near the cylinder 51 in order to indicate the temperature of the block 13.

Figure 2:
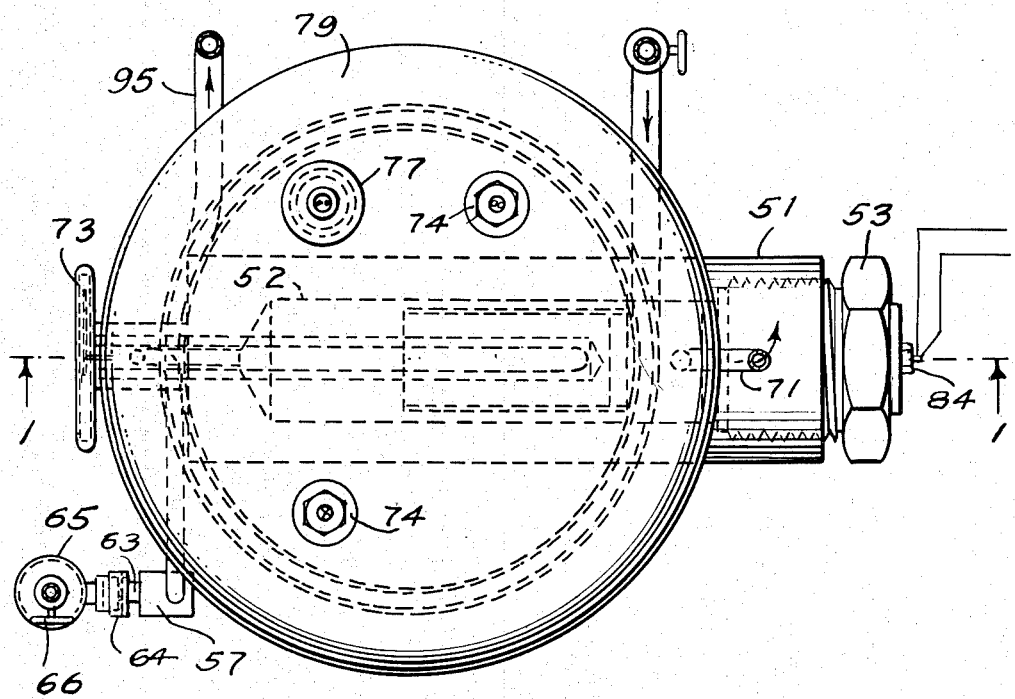
Figure 2 is a top plan view of the device of this invention.

A plurality of heater elements 74 are mounted in the block 13 parallel to its axis. As shown in Figures 1 and 2, the heater elements 74 comprise an electrical resistance winding 75 connected through a relay 76 to a source of electrical current not shown. The relay 76 is adapted to permit electric current to flow through the resistance winding 75 until interrupted by a temperature responsive device 77.

As shown in Figure 1, the temperature responsive device 77 comprises a liquid filled tube 78 and a conventional Sylphon switch not shown, such that the armature winding 78a of the relay 76 is energized when the temperature of the block 13 is sufficiently high. Upon energizing the armature winding 78a, the relay 76 opens the circuit for the resistance winding 75 and no further heating takes place. Conversely, when the temperature of the block 13 drops under the influence of cooling coil 70, the temperature responsive device 77 allows the relay 76 to close the circuit and energize the heater element 74, whereby the temperature is brought back to a predetermined level indicated by the thermometer 73.

Surrounding the block 13 and coils 70 and 56 is a jacket of thermal insulation 79 which aids in maintaining the selected temperature conditions in the block 13 and cylinder 51.

It will be seen that the cylinder 51 having a hollow portion 52 and the plug 53 defines a receptacle adapted to be traversed by purified gas whose temperature is maintained substantially constant within the range dictated by the settings of the heating and cooling means heretofore described.

The threaded plug 53 supports an insulating base 80 which in turn supports within the hollow portion 52 of the cylinder 51, the hygrometer assembly now to be described. The hygrometer assembly comprises a cylindrical element 81 which may be made of polystyrene or other suitable insulating plastic. A pair of concentric coils 82 and 83 are disposed about the cylindrical element 81 in such fashion that the windings of each coil do not touch the adjacent coil. The coils are preferably made of palladium wire and each coil is connected to a lead 84 extending through the plug 53. The cylindrical element 81 is coated with a deposit of lithium chloride or other suitable salt whose electric resistivity varies with the moisture content of the surrounding atmosphere. It will be seen that as purified gas traverses the open portion 52 of the receptacle, it is brought in contact with the salt layer deposited on the cylindrical element 81. By virtue of the heating and cooling means previously described, the gas and the block 13 are brought to a predetermined temperature and thus isothermal conditions are maintained within the open portion 52 of the receptacle assembly.

The electrical leads 84 emerging from the plug 53 are connected to a suitable balanced bridge circuit and indicating device capable of measuring the variation in electrical resistivity of the salt layer deposited on the cylindrical element 81. As shown in Figure 1, the bridge circuit comprises a transformer 85 having a primary winding 86 and two secondary windings 87 and 88. One secondary winding 87 is connected through a pair of resistances 89 and 90 through a switch 91 to the leads 84 from the hygrometer device.

In order to minimize electrical interference, the lead wires 92 from the transformer secondary 87 to the leads 84 of the hygrometer device may be shielded with shielding 93. The shielding 93 of each lead wire is connected to the other shielding and shunted across the resistance 90 which provides an IR drop to be measured. From a consideration of the electrical circuit, it will be seen that as the resistance of the salt coating on the cylindrical element 81 varies, the total current flowing from the transformer secondary through the resistances 89 and 90 and the salt layer on the element 81 will similarly vary. Accordingly, by interposing the resistance 90 in the circuit an IR drop will exist across the resistance 90 that is proportional to the variation in resistance of the hygrometer element. It is only necessary, therefore, to balance the IR drop across the resistance 90 through a suitable potentiometer device to provide a measure of the resistance through the salt layer deposited on the hygrometer element 81. This is accomplished by connecting a recording potentiometer 94 across the resistance 90. The balancing current for the recording potentiometer 94 is obtained from the secondary winding 88 of the transformer 85 and, therefore, will be in phase with the current derived from the secondary winding 87.

In the operation of the instant device, gas to be sampled passes through the valve 66, the trap 65, the filter 64 and the glycol absorber 57 into the temperature equalizing coil 56. The resistance winding 75 is energized through the relay 76 from a source of electrical energy not shown and the temperature of the block 13 rises to a predetermined level. The coil 70 is cooled by fluid entering the inlet tube 71 and controlled by the valve 72. Thus, the block 13 is concurrently cooled and a continuous transfer of heat takes place between the resistance winding 75 and the cooling coils 70. With this large transfer of heat, the quantity of heat taken up by the gas traversing the coil 56 becomes nominal. Thus, the purified gas sample entering the inlet 54 into the open portion 52 of the receptacle is brought in contact with the hygrometer element at a constant predetermined temperature and discharged through the gas outlet 55. By means of the pressure valve 68 and the flow control device 69, the rate of gas flow through the entire instrument is made constant. After equilibrium conditions are obtained, the bridge circuit transformer 85 and recorder 94 are energized by a source of alternating current not shown and calibrated to read directly in terms of the moisture content of the gas sample at the predetermined temperature selected. Thereafter, variations in water vapor content of the gas sample are read directly on the recording potentiometer 94.

It will be apparent that this invention provides a simple and practical device for measuring the water vapor content and thus the dew-point of gases under pressure. The device can be made of any suitable strength, limited only by the materials of construction and thus is adapted to determining the dew-point of natural gas under pressure.

Since many apparently differing embodiments of this invention will occur to one skilled in the art, it is obvious that various changes can be made in the specific details shown and described without departing from the spirit and scope of this invention.

What is claimed is:

In a device for measuring the moisture content of a gas sample, the combination of a cylindrical temperature equalizing member with a non-corrosive pressure-resistant receptacle radially extending through said member near the central portion thereof, a humidity-responsive electrical resistance element mounted in said receptacle, cooling means including a coil embracing said member near the upper portion thereof, heat-exchange means including a coil embracing said member near the lower portion thereof, said heat-exchange coil being adapted to bring a purified gas sample to the temperature of said member and deliver it to said receptacle, means for electrically heating said member to a predetermined temperature, means connected to said heat-exchange coil for purifying a gas sample, means for controlling the flow-rate of gas through said receptacle, and means for measuring and indicating the electrical resistivity of said humidity-responsive element.

WILLIAM M. DEATON.

REFERENCES CITED

The following references are of record in the file of this patent:

UNITED STATES PATENTS

| Number | Name | Date |
|---|---|---|
| 1,942,934 | Reeve | Jan. 9, 1934 |
| 2,381,299 | McCulloch | Aug. 7, 1945 |